(12) United States Patent
Li et al.

(10) Patent No.: US 11,448,870 B1
(45) Date of Patent: Sep. 20, 2022

(54) MICROSHUTTER ARRAY

(71) Applicant: United States of America as represented by the Administrator of NASA, Washington, DC (US)

(72) Inventors: Mary Li, Greenbelt, MD (US); Kyowon Kim, Greenbelt, MD (US); Alexander Kutyrev, College Park, MD (US); Matthew Greenhouse, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 322 days.

(21) Appl. No.: 16/862,037

(22) Filed: Apr. 29, 2020

Related U.S. Application Data

(60) Provisional application No. 62/964,762, filed on Jan. 23, 2020.

(51) Int. Cl.
*G02B 26/04* (2006.01)
(52) U.S. Cl.
CPC ..................... *G02B 26/04* (2013.01)

(58) Field of Classification Search
CPC ............................... G02B 26/02; G02B 26/04
See application file for complete search history.

(56) References Cited

U.S. PATENT DOCUMENTS

2017/0075105 A1* 3/2017 Li ..................... G02B 26/04

* cited by examiner

*Primary Examiner* — Joseph P Martinez
(74) *Attorney, Agent, or Firm* — Christopher O. Edwards; Bryan A. Geurts; Helen M. Galus

(57) ABSTRACT

A microshutter array can have a frame, a plurality of linear microshutter elements, and a plurality of electrodes. The frame defines a plurality of openings and each opening is defined by a first sidewall, a second sidewall, a third sidewall opposing and parallel to the first sidewall, and a fourth sidewall. Each opening includes a light-transmissive portion configured to span an area. The plurality of linear microshutter elements are configured to extend across at least a part of the area. Each linear microshutter element can have a blade extending in a length direction across and blocking the light-transmissive portion. Each linear microshutter element can have a neck extending from the blade, and at least one torsion bar connected to the neck and connected to sidewalls of the frame.

20 Claims, 13 Drawing Sheets

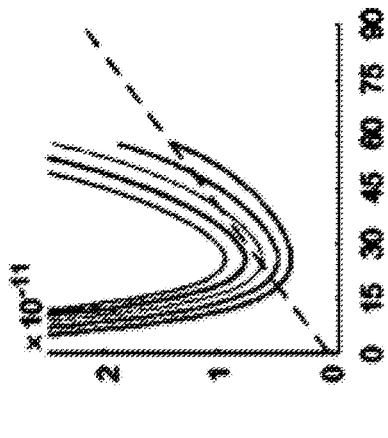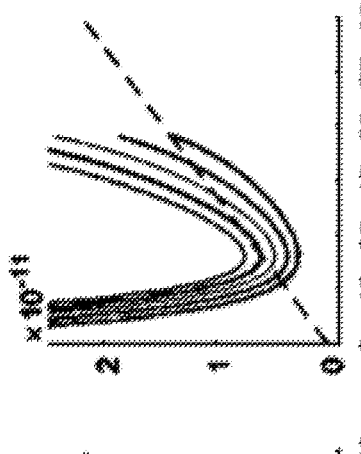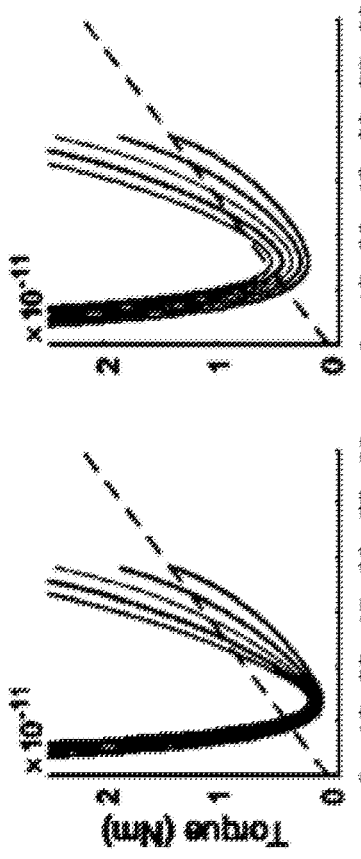
FIG. 23  FIG. 24  FIG. 25  FIG. 26
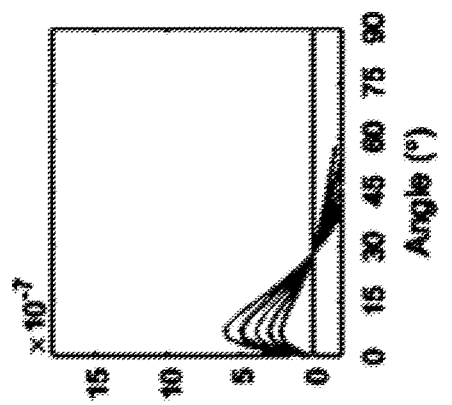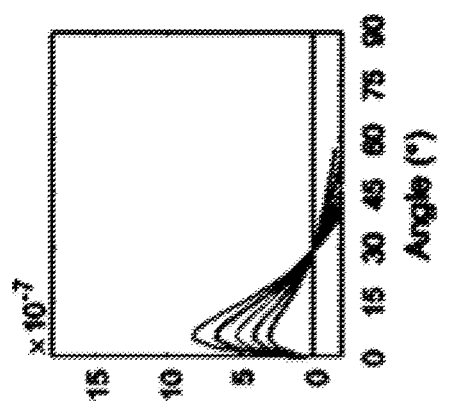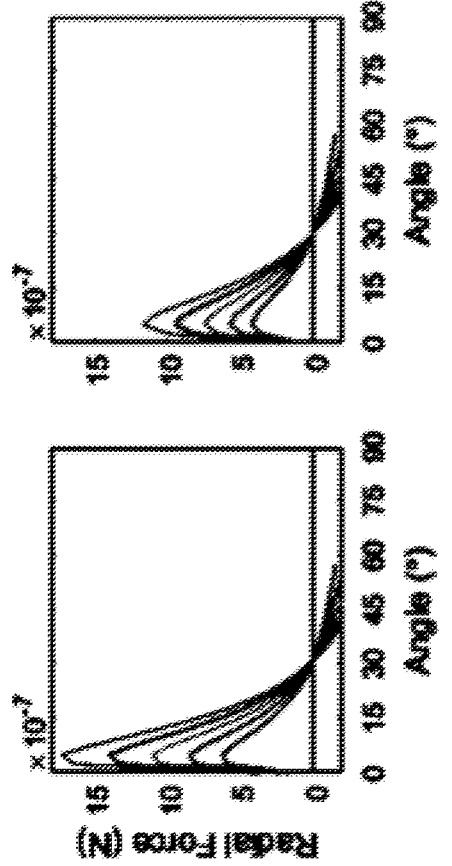
FIG. 27  FIG. 28  FIG. 29  FIG. 30

MICROSHUTTER ARRAY

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefor.

BACKGROUND OF THE INVENTION

Field of the Invention

Microshutter arrays have been developed for use in satellite-based telescopes. The microshutter arrays are a collection of window-like openings, each opening having a shutter, the window-like openings measuring, normally, 100 by 200 micrometers, or about the size of a bundle of only a few human hairs. Arrays of these tiny openings are a key component of various spectrometers, an example being the Near Infrared Spectrograph (NIRSpec) of the James Webb Space Telescope. Spectrometers, such as the NIRSpec, can record the spectra of light from distant objects, for example, distant galaxies.

Given the large distance between galaxies under observation and earth-borne, satellite-based telescopes might not be able to focus on, for example, only one galaxy. Thus, light from adjacent galaxies can be simultaneously processed via the satellite-based telescopes, and thus performing spectroscopic experiments on single galaxies can be very difficult.

Microshutter arrays help solve the above-described problem. A microshutter array can fit over a light-receiving element in the satellite-based telescope, and one opening of the microshutter array can roughly correspond to a projected height and width of one galaxy. Thus, by opening one microshutter in the microshutter array, the satellite-based telescope can examine one galaxy that visually fits inside the one window-like opening upon the opening of the microshutter.

A microshutter array can have numerous window-like openings, such as, for example, up to 300,000 window-like openings in the array. Individual microshutters can be controlled in the microshutter array, and thus numerous, parallel experiments can be conducted by opening various microshutters and examining objects falling within the visible area of the window-like openings. Other spectroscopic instruments have flown in space before, but none have had the capability to enable high-resolution (spectroscopic) observation of a large number of objects simultaneously, allowing for more scientific investigating being done in less time.

One problem in the use of known microshutter arrays is the power needed to open individual microshutters. For powered objects in space, the power consumption by individual components is a constant area of concern, as lower power consumption can provide numerous benefits in the launching and operation of the satellites. Not much is known about the power demands (and dynamics) in the opening of individual microshutters, and the present inventors have studied the structure of the microshutter arrays and the influence of the structure on the power demands (and motions) in the opening of individual shutters. The present inventors have also developed models to test microshutter designs, thus leading to the present invention.

SUMMARY OF THE INVENTION

The present invention includes a microshutter array that comprises a frame, a plurality of linear microshutter elements, and a plurality of electrodes. The frame defines a plurality of openings and each opening is defined by a first sidewall, a second sidewall, a third sidewall opposing and parallel to the first sidewall, and a fourth sidewall. Each opening includes a light-transmissive portion configured to span an area. The plurality of linear microshutter elements are configured to extend across at least a part of the area. Each linear micro shutter element can comprise a blade extending in a length direction across and blocking the light-transmissive portion. Each linear microshutter element can comprise a neck extending from the blade, and at least one torsion bar connected to the neck and connected to sidewalls of the frame. The torsion bar can be rotatable under the influence of an applied electrostatic field. For each torsion bar, upon application of an electrostatic field, (a) the torsion bar rotates, (b) the respective neck and respective blade rotate with the torsion bar, and (c) the respective blade moves into an orientation such that the blade no longer blocks the light-transmissive portion. The blade comprises a distal edge that is parallel to the third sidewall such that a gap between the distal edge and the third sidewall is provided. The gap can be from 1 micrometer to 10 micrometers.

BRIEF DESCRIPTION OF THE DRAWINGS

While the specification concludes with claims particularly pointing out and distinctly claiming the subject matter that is regarded as forming the present invention, it is believed that the invention will be better understood from the following Detailed Description, taken in conjunction with the accompanying drawings, where like reference numerals designate like structural and other elements.

FIGS. 23-26 show a torque versus angle plot for microshutters having different blade lengths.

FIGS. 27-30 show radial force versus shutter blade angle plots for microshutters having different blade lengths.

DETAILED DESCRIPTION OF THE INVENTION

Figure 1:
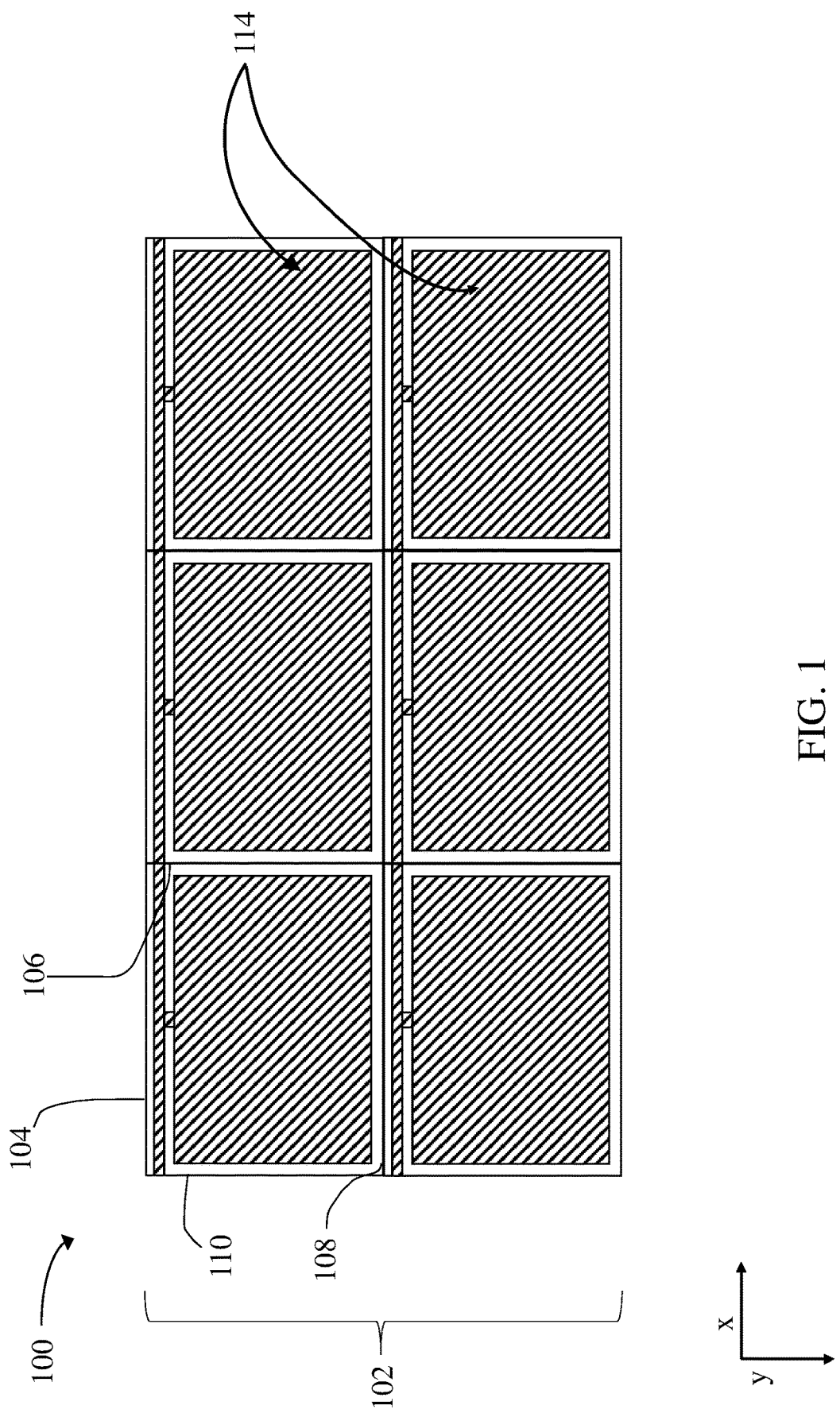
FIG. 1 shows a microshutter array according to the present invention.

According to various embodiments of the present invention, a microshutter array is provided that comprises a frame, a plurality of linear microshutter elements, and a plurality of electrodes. The frame defines a plurality of openings and each opening is defined by a first sidewall, a second sidewall, a third sidewall opposing and parallel to the first sidewall, and a fourth sidewall. Each opening includes a light-transmissive portion configured to span an area. The plurality of linear microshutter elements are configured to extend across at least a part of the area. Each linear microshutter element can comprise a blade extending in a length direction across and blocking the light-transmissive portion. Each linear microshutter element can comprise a neck extending from the blade, and at least one torsion bar connected to the neck and connected to sidewalls of the frame. The torsion bar can be rotatable under the influence of an applied electrostatic field. For each torsion bar, upon application of an electrostatic field, (a) the torsion bar rotates, (b) the respective neck and respective blade rotate with the torsion bar, and (c) the respective blade moves into an orientation such that the blade no longer blocks the light-transmissive portion. The blade comprises a distal edge that is parallel to the third sidewall such that a gap between the distal edge and the third sidewall is provided. The gap can be from 1 micrometer to 10 micrometers, for example, from 2 micrometers to 5 micrometers, from 2 micrometers to 3 micrometers, or not more than 3 micrometers.

The plurality of electrodes can include at least two electrodes for each linear microshutter element. The plurality of electrodes can be connected to a voltage generator that generates electricity at a target voltage of from 40 volts to 120 volts, for example, from 60 volts to 100 volts or from 80 volts to 100 volts. The voltage generator can be configured to generate the target voltage, starting from zero (0) volts, in 200 microseconds or less, for example, in 100 microseconds or less, in 50 microseconds or less, in 20 microseconds or less, or in 15 microseconds or less. The voltage generator can be configured to generate the target voltage, starting from zero (0) volts, in no more than 20 microseconds.

Each blade can be sized to fit within one opening of the plurality of openings. Each blade can have a width of from 100 micrometers to 300 micrometers, for example, from 150 micrometers to 250 micrometers, from 180 micrometers to 220 micrometers, or from 192 micrometers to 198 micrometers. Each blade can have a length of from 50 micrometers to 150 micrometers, for example, of less than 120 micrometers, of less than 100 micrometers, of less than 95 micrometers, or of less than 93 micrometers. Each neck can have a width of from 5 micrometers to 100 micrometers, for example, of from 5 micrometers to 50 micrometers, of from 10 micrometers to 30 micrometers, or of 25 micrometers or less. Each neck can have a length of from 0.5 micrometers to 50 micrometers, for example, of from 1 micrometer to 10 micrometers, of from 2 micrometers to 6 micrometers, or 5 micrometers or less.

The plurality of linear microshutter elements can comprise over 10,000 linear microshutter elements, for example, over 100,000 linear microshutter elements over 200,000 linear microshutter elements, or over 240,000 linear microshutter elements, or over 250,000 linear microshutter elements. One design of a microshutter array has about 283,000 individual linear microshutter elements (e.g., 282, 600). Each linear microshutter element can be independently controllable with respect to the other linear microshutter elements. Groups of linear microshutter elements can be controlled together. The linear microshutter elements of a column, length of a column, row, or length of a row, of linear microshutter elements, can be controlled together.

Each torsion bar has a length. For each linear microshutter element, the respective neck is connected to the respective torsion bar at a mid-point along the length of the respective torsion bar. The frame can comprise one opening per linear microshutter element, and each opening can have a length and a width. The width of the opening can be longer than the length of the opening. Each linear microshutter element can be mounted for movement within a respective one of the openings. The respective torsion bar of each linear microshutter element can span the width of the respective opening and can connect to the frame on opposing sidewalls that define the width of the respective opening. The second sidewall and the fourth sidewall can be opposing sidewalls. The respective torsion bar of each linear microshutter element can also be elastically deformable.

Each blade from the plurality of linear microshutter elements has a proximal edge, the distal edge, a first lateral edge, and a second lateral edge. The proximal edge can be aligned with, and parallel to, the first sidewall. The first lateral edge can be aligned with, and parallel to, the second sidewall. The second lateral edge can be aligned with, and parallel to, the fourth sidewall. For each opening, the torsion bar can be attached at one end, to the second sidewall, and attached, at an opposite end, to the fourth sidewall. The torsion bar can be parallel to the first sidewall and located in between the first sidewall of the opening and the proximal edge of the blade. The torsion bar can be spaced by a first distance, from the first sidewall. The spacing of the torsion bar can define a first gap between the first sidewall and the torsion bar. The first gap can be, for example, from 0.1 micrometers 20 micrometers, from 0.3 micrometers to 10 micrometers, from 0.4 micrometers to 5 micrometers, or from 0.5 micrometers to 1.5 micrometers. In one embodiment, the first gap can be from 1 micrometers to 3 micrometers.

The blade can comprise a first layer and a second layer on top of the first layer. The first layer can extend beyond the second layer such that the second layer does not cover the entirety of the first layer. The distal edge can the edge of the first layer. The distal edge of the blade and the distal edge of the first layer can be flush with one another. The first layer can comprise a semiconductor layer, an insulator layer, a silicon layer, an elastic insulator, or the like. The first layer can comprise $Si_3N_4$ (silicon nitride). The second layer can comprise a conductive layer, a metal layer, a combination thereof, or the like. The second layer can comprise aluminum, gold, or a combination thereof. Each torsion bar can comprise a semiconductor layer, an insulator layer, a silicon layer, or the like. Each torsion bar can comprise $Si_3N_4$. Each torsion bar can independently have a thickness of from 250 nm to 1000 nm, for example, from 350 nm to 750 nm or from 450 nm to 650 nm. Each torsion bar can have a width of from 0.75 micrometers to 4 micrometers, for example, from 1.25 micrometers to 2.75 micrometers, from 1.5 micrometers to 2.25 micrometers, or from 1.75 micrometers to 2 micrometers.

Upon application of an electrostatic field, the neck and blade rotate. The neck and blade can rotate by an angle of from 60° to 120°, for example, from 70° to 110°, from 80° to 100°, or by about 90°. The microshutter array can be used in combination with an array of pixels. The pixels can be part of a charge-coupled device, a photomultiplier device, a photographic medium, or the like. The array of pixels can be aligned with the frame. The frame can comprise silicon.

The present invention also provides methods of making the microshutter arrays described herein. The method can comprise micromachining a first surface of a silicon wafer to remove sections of the silicon wafer while maintaining a design that results in the formation of the torsion bar, the neck, and the blade. The method can include depositing, via chemical vapor deposition, a silicon-nitride composition on surfaces of the torsion bar, the neck, and the blade, to thereby form silicon-nitride covered surfaces. The method can comprise depositing, via electron beam deposition, aluminum on the silicon-nitride covered surfaces. A second surface of the silicon wafer can be etched by reactive ion etching to thereby remove a plurality of sections from the silicon wafer and form a plurality of openings in the silicon wafer.

Another method according to the present invention includes controlling a microshutter array as described herein, by ramping up applied voltage in a short amount of time. The voltage generator can be configured to ramp voltage up from a starting voltage of 0 volts, to a target voltage, in 100 microseconds or less, for example, in 80 microseconds or less, in 50 microseconds or less, in 30 microseconds or less, in 20 microseconds or less, in 16 microseconds or less, or in 15 microseconds or less. The voltage generator can be configured to ramp voltage up from a starting voltage of 0 volts, to a target voltage of 100 volts in from 10 microseconds to 20 microseconds, for example, in a time of from 12 microseconds to 18 microseconds.

In yet another embodiment of the present invention, a microshutter array is provided that comprises a frame, a plurality of linear microshutter elements, and a plurality of electrodes, and having a special spacing between components. The frame can have a plurality of openings defined by a first sidewall, a second sidewall, a third sidewall opposing and parallel to the first sidewall, and a fourth sidewall. Each opening can include a light-transmissive portion configured to span an area. The plurality of linear microshutter elements can be configured to extend across at least a part of the area. Each linear microshutter element can comprise a blade extending in a length direction across and blocking the light-transmissive portion. Each linear microshutter element can comprise a neck extending from the blade. Each linear microshutter element can comprise a torsion bar connected to the neck and connected to the sidewalls of the frame.

The torsion bar can be rotatable under the influence of an applied electrostatic field. For each torsion bar, upon application of an electrostatic field, (a) the torsion bar rotates, (b) the respective neck and respective blade rotate with the torsion bar, and (c) the respective blade moves into an orientation such that the blade no longer blocks the light-transmissive portion. The plurality of electrodes can include at least two electrodes for each linear microshutter element. The electrodes of the plurality of electrodes can be connected to a voltage generator that generates electricity, for example, at a target voltage of from 60 volts to 100 volts. Other voltages and rates as described herein can be used.

Each blade can comprise a distal end that is parallel to the third sidewall and spaced from the third sidewall by a gap. The gap can define a spacing, for example, of not more than 10 micrometers, of not more than 9 micrometers, of not more than 8 micrometers, of not more than 7 micrometers, or of from 2 micrometers to 7 micrometers. Each blade can be sized to fit within one opening of the plurality of openings. Each blade can have a width, for example, of from 192 micrometers to 195 micrometers. Each blade can have a length, for example, of less than 93 micrometers. Other lengths and widths described herein can be used. The plurality of linear microshutter elements can comprise over 200,000 linear microshutter elements. Other numbers of elements as described herein can be used.

Each torsion bar can have a length, and, for each torsion bar, the respective neck can be connected to the respective torsion bar at a mid-point along the length of the respective torsion bar. The frame can comprise one opening per linear microshutter element and each opening can have a length and width wherein the width is greater than the length. Each linear microshutter element can be mounted for movement within a respective one of the openings, and the respective torsion bar of each linear microshutter element can span the width of the respective opening and connects to the frame on opposing sidewalls that define the width of the respective opening. The second sidewall and the fourth sidewall can be opposing sidewalls. Each blade from the plurality of linear microshutter elements has a proximal edge, the distal edge, a first lateral edge, and a second lateral edge. The first lateral edge can be aligned with, and parallel to, the second sidewall. The second lateral edge can be aligned with, and parallel to, the fourth sidewall. For each opening, the respective torsion bar is attached, at one end, to the second sidewall and attached, at another end, to the fourth sidewall, such that the respective torsion bar is parallel to and spaced from the first sidewall. For each opening, the torsion bar is spaced from the first sidewall by a gap, for example, by a gap of from 0.5 micrometer to 1.5 micrometers. Other gap sizes as described herein can be used.

The blade can comprise a first layer and a second layer on top of the first layer. The first layer can extend beyond the second layer such that the second layer does not cover the entirety of the first layer. The distal edge can be defined by the edge of the first layer, the edge of the bade, or both. The first layer can comprise $Si_3N_4$ and the second layer can comprise aluminum, gold, or a combination thereof. Other materials can be used for the first and second layers, as described herein. The distal edge of the blade can be flush with an edge of the first layer. The gap can define a spacing of not more than 7 micrometers. Other spacings as described herein can be used. The gap can be defined between the edge of the first layer and the third sidewall, and the second layer can be offset at least one micrometer from the distal edge of the blade. The gap can define a spacing of from 2 micrometers to 5 micrometers.

The neck can have a width of 25 micrometers or less and a length of 5 micrometers or less. Other sizes as described herein can be used. The at least one torsion bar can comprise $Si_3N_4$. The at least one torsion bar can have a thickness of from 350 nm to 750 nm. Other sizes as described herein can be used. Each torsion bar can have a thickness of from 400 nm to 700 nm. Other sizes as described herein can be used. The at least one torsion bar can have a width of from 1.25 micrometers to 2.75 micrometers. Other sizes as described herein can be used. The at least one torsion bar can have a width of from 1.35 micrometers to 2.05 micrometers. Other sizes as described herein can be used.

Each linear microshutter element can be independently controllable, or controlled with a group, as described herein. Upon application of an electrostatic field, the neck and blade rotate by an angle, for example, of from 80° to 100°. Other angles as described herein can be achieved. The microshutter array can be provided in combination with an array of pixels comprising a charge-coupled device, the array of pixels being aligned with the frame. Other photometric receiving devices can be used. The frame can comprise silicon. Each opening of the plurality of openings can have a first width and a second width, wherein the first width is a distance between the second sidewall and the fourth sidewall at a top of the opening near the blade. The second width can be a distance between the second sidewall and the fourth sidewall at a bottom of the opening. The first width and the second width can be different from one another. Each blade can have a width of from 192 micrometers to 198 micrometers. Other blade sizes as described herein can be used. Each blade can have a first width and a second width, wherein the first width is defined by the proximal edge, the second width is defined by the distal edge, and the first width is longer than the second width such that the proximal edge is longer than the distal edge. The first width can be from 192 micrometers to 198 micrometers, the second width can be from 190 to 196 micrometers, and the first width can be greater than or equal to the second width. Other widths and sizes and ratios as described herein, can be used.

The present invention also provides a method of making a microshutter array with special spacing, as described herein. The method can comprise micromachining a first surface of a silicon wafer, thereby removing sections of the silicon wafer and maintaining a design that results in the formation of the torsion bar, the neck, and the blade. The method can comprise depositing, via chemical vapor deposition, a silicon-nitride composition on surfaces of the torsion bar, the neck, and the blade, thereby forming silicon-nitride covered surfaces. The method can comprise depositing, via electron beam deposition, aluminum on the silicon-nitride covered surfaces. The method can comprise reactive ion etching a second surface of the silicon wafer, thereby removing a plurality of sections from the silicon wafer and forming a plurality of openings in the silicon wafer.

FIG. 1 shows a microshutter array (100) according to the present invention, in the x-y plane. Microshutter array (100) can comprise, consist of, consist essentially of, have, or include, a frame having a plurality of openings (102), each opening defined by a first sidewall (104), a second sidewall (106), a third sidewall (108), and a fourth sidewall (110), each opening including a light-transmissive portion (112) that spans an area. Microshutter array (100) can also comprise, consist of, consist essentially of, have, or include, a plurality of linear microshutter elements (114) extending across at least a part of the area included in the light-transmissive portion. FIG. 1 is non-limiting and shows a series 2×6 array of openings, one opening defined by the four sidewalls. Microshutter array (100) can have as many as 1,000,000 openings, preferably not more than 250,000 openings.

Figure 2:
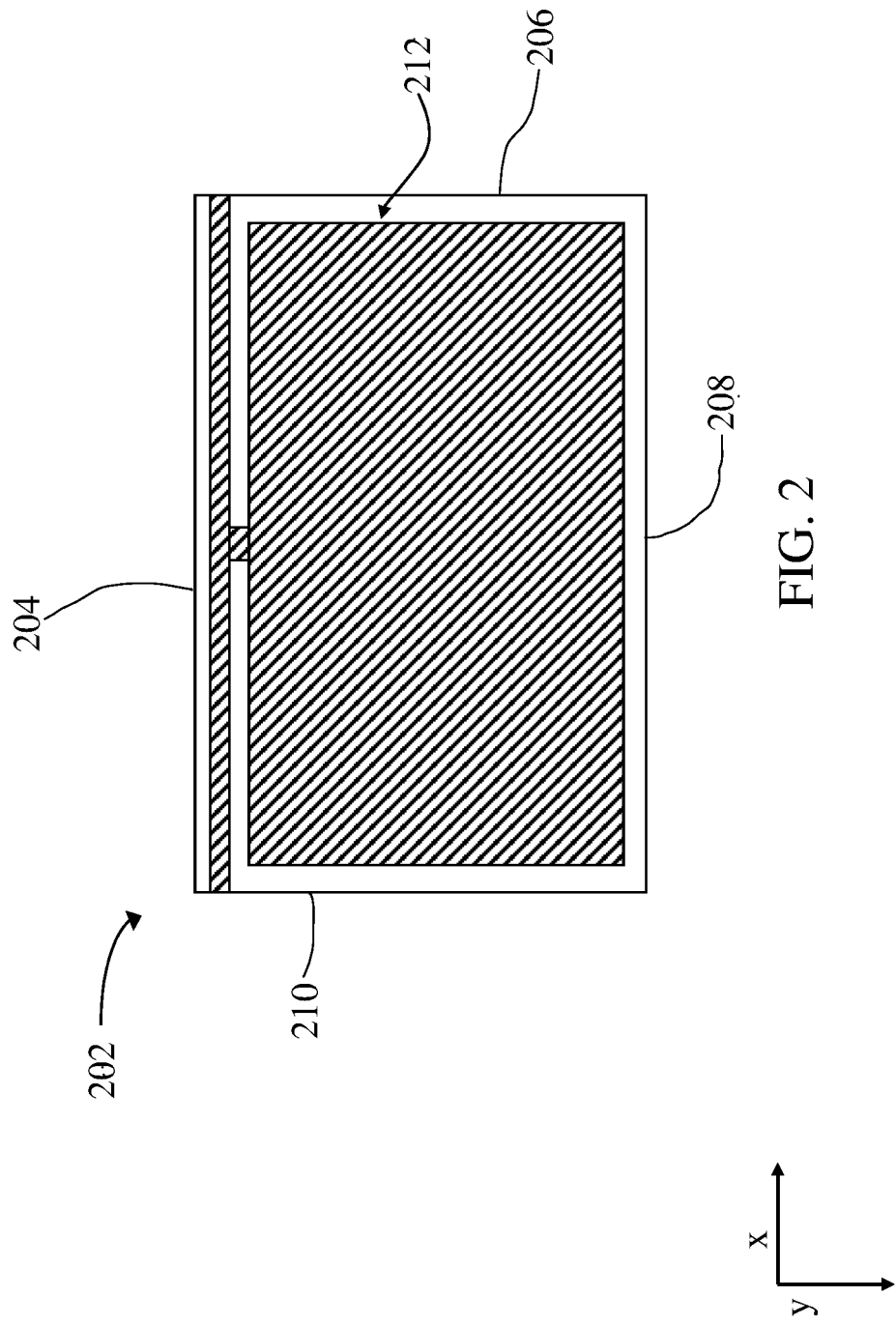
FIG. 2 shows a first embodiment of an array-unit according to the present invention.

In microshutter array (100), each opening (102) has one linear microshutter element. FIG. 2 shows one opening (202), defined by first sidewall (204), second sidewall (206), third sidewall (208), and fourth sidewall (210), opening (202) having present therein one linear microshutter element (212).

First sidewall (204) can be opposite of third sidewall (208), and a relative angle between the two is from 0.0 to 0.1°, preferably 0.0°, such that first sidewall (204) and third sidewall (208) are substantially parallel to each other. Second sidewall (206) can be opposite of fourth sidewall (2010), and a relative angle between the two is from 0.0 to 0.1°, preferably 0.0°, such that second sidewall (206) and fourth sidewall (210) are substantially parallel to each other. Collectively, first sidewall (204), second sidewall (206), third sidewall (208), and fourth sidewall (210) can be referred to as "the four sidewalls" of opening (202). The four sidewalls define an opening, wherein one linear microshutter element (212) is present in the opening. As an option, the four sidewalls can form a rectangular shape, wherein the first sidewall and the third sidewall are substantially the same length and shorter than the second sidewall and the fourth sidewall, wherein the second sidewall and the fourth sidewall are substantially the same length. Alternatively, as another option, the first sidewall and the third sidewall are substantially the same length and longer than the second sidewall and the fourth sidewall, wherein the second sidewall and the fourth sidewall are substantially the same length.

A distance between first edge (212) and torsion bar (208) is set by the length of neck (908). A distance between second edge (214) and second sidewall (202) can be from 0.5 micron to 3 micrometers, defining a gap or space between second edge (214) and second sidewall (202). A distance between third edge (216) and third sidewall (203) can be from 0.5 micron to 3 micrometers, defining a gap or space between third edge (216) and third sidewall (203). A distance between fourth edge (218) and fourth sidewall (204) can be from 0.5 micron to 6 micrometers, defining a gap or space between fourth edge (218) and fourth sidewall (204). Preferably, the distance between fourth edge (218) and fourth sidewall (204) can be from 3 micron to 6 micrometers, more preferably from 3.5 micrometers to 6 micrometers.

Figure 3B:
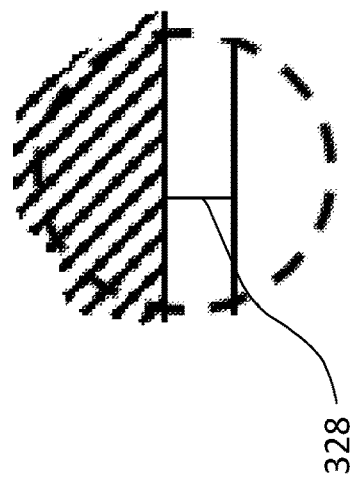
FIG. 3B shows a gap between parts of a microshutter array according to the present invention.
Figure 3A:
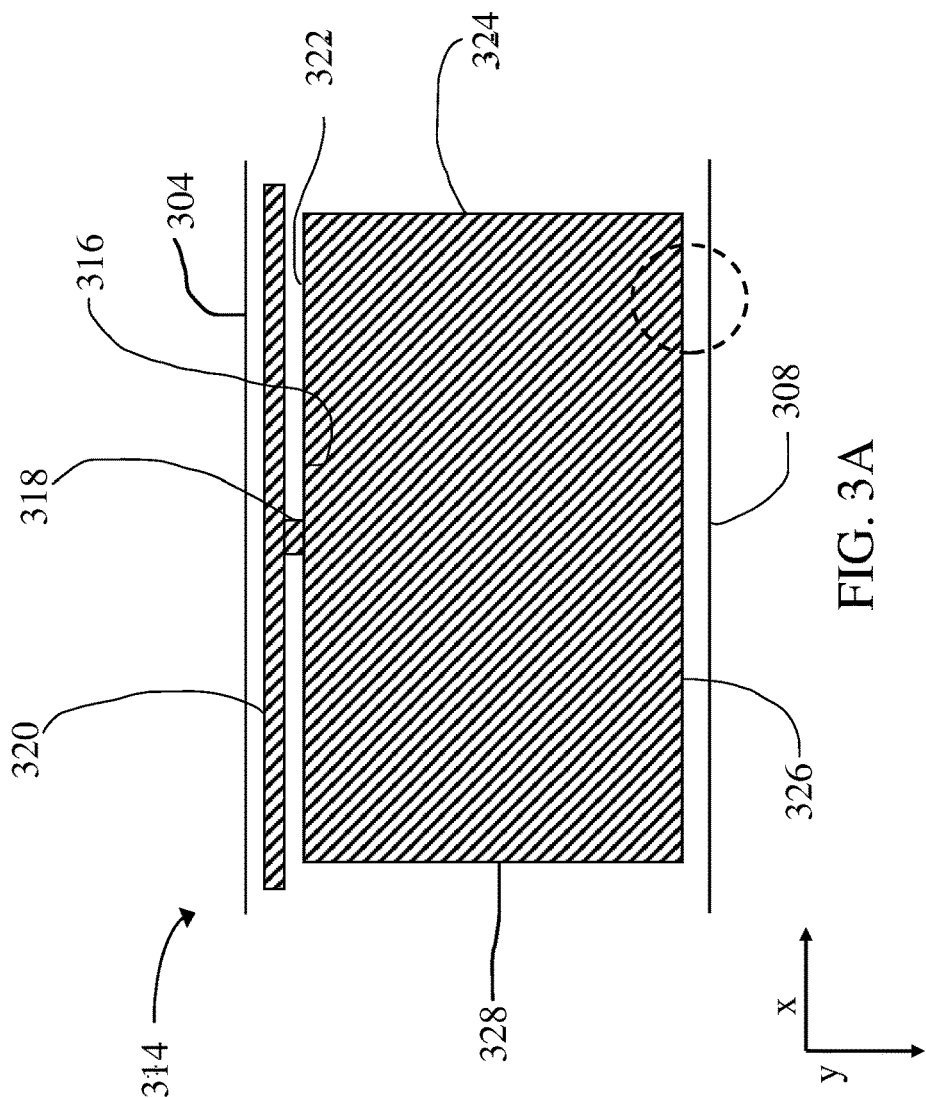
FIG. 3A shows a linear microshutter element according to the present invention.

FIG. 3A shows a view of the linear microshutter element (314). Linear microshutter element (314) can comprise, consist of, consist essentially of, have, or include, a blade (316) extending in a length direction across and blocking the light-transmissive portion, a neck (318) extending from the blade, and at least one torsion bar (320) connected to neck and to sidewalls of the frame. The at least one torsion bar is rotatable under the influence of an electrostatic field, and, upon application of an electrostatic field, (a) the at least one torsion bar rotates, (b) the neck and blade rotate with the at least one torsion bar, and (c) the blade moves into an orientation such that the blade no longer blocks the light-transmissive portion.

Blade (316) comprises a proximal edge (322), a first lateral edge (324), a distal edge (326) and a second lateral edge (328). FIG. 3A also shows first sidewall (304) and third sidewall (308) of the opening in which linear microshutter element (314) is present, and the other two sidewalls are not shown. FIG. 3B shows an expanded view of part of FIG. 3A, the expanded view showing a gap (328). The gap can be from 1 micrometer to 10 micrometers.

Neck (318) has a length and a width, the length of the neck being in the x-direction and the width of the neck being in the y-direction. The length can be from 0.5 micrometers to 1.5 micrometers and the width can be from 0.25 micron to 1.5 micrometers.

FIG. 3A also shows first sidewall (304), wherein a distance between this sidewall and proximal edge (322). Torsion bar (320) and neck (318) are present in this gap. A distance between first sidewall (304) and torsion bar (320) can be from 5 to 10 micrometers.

Figure 4:
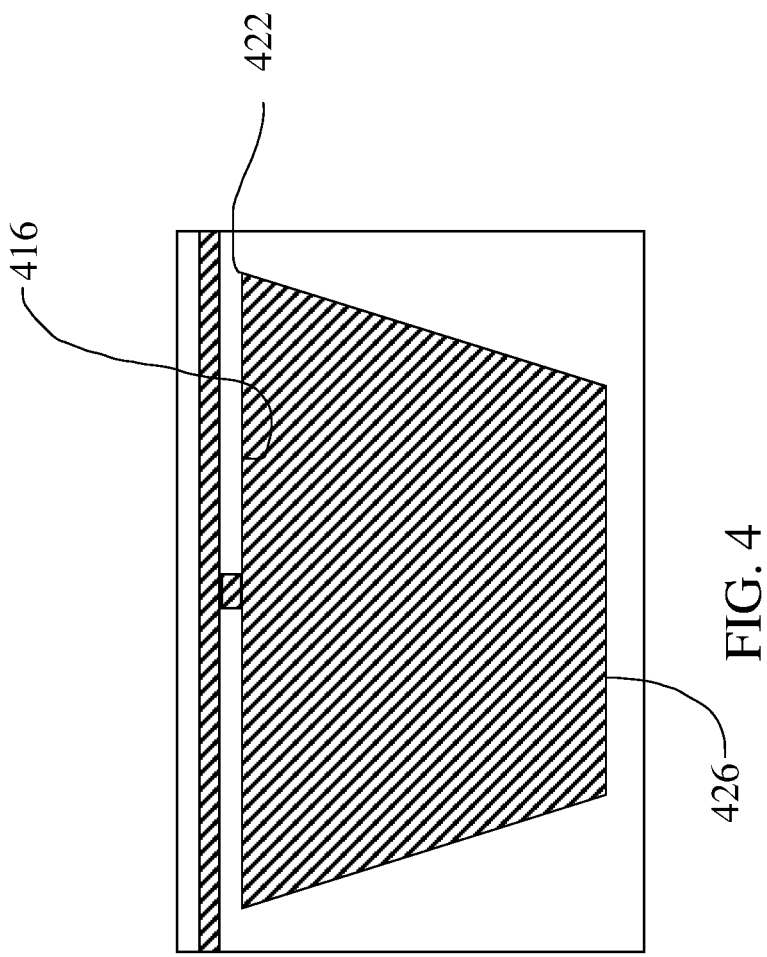
FIG. 4 shows a second embodiment of an array-unit according to the present invention.

FIG. 4 shows another embodiment of the linear microshutter element of the present invention. The blade (416) of this linear microshutter element also has a proximal edge (422) and a distal edge (426), but distal edge (426) is shorter in length than proximal edge (422). In this embodiment, the width of the proximal edge, a first width, is from 192 micrometers to 198 micrometers, and the width of the distal edge, the second width, is from 190 to 196 micrometers, provided that the first width is greater than the second width.

Figure 6:
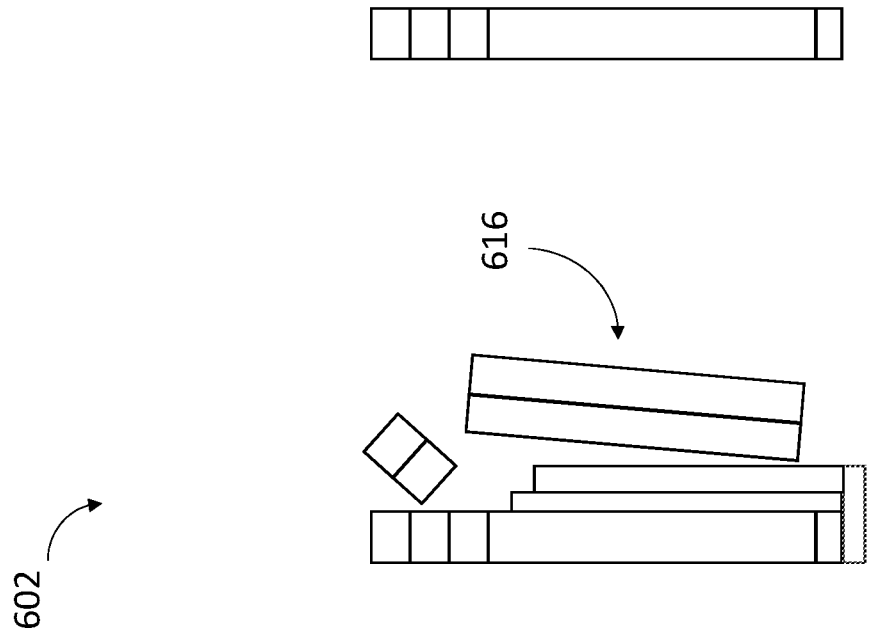
FIG. 6 shows a second side perspective of an array-unit according to the present invention.
Figure 5:
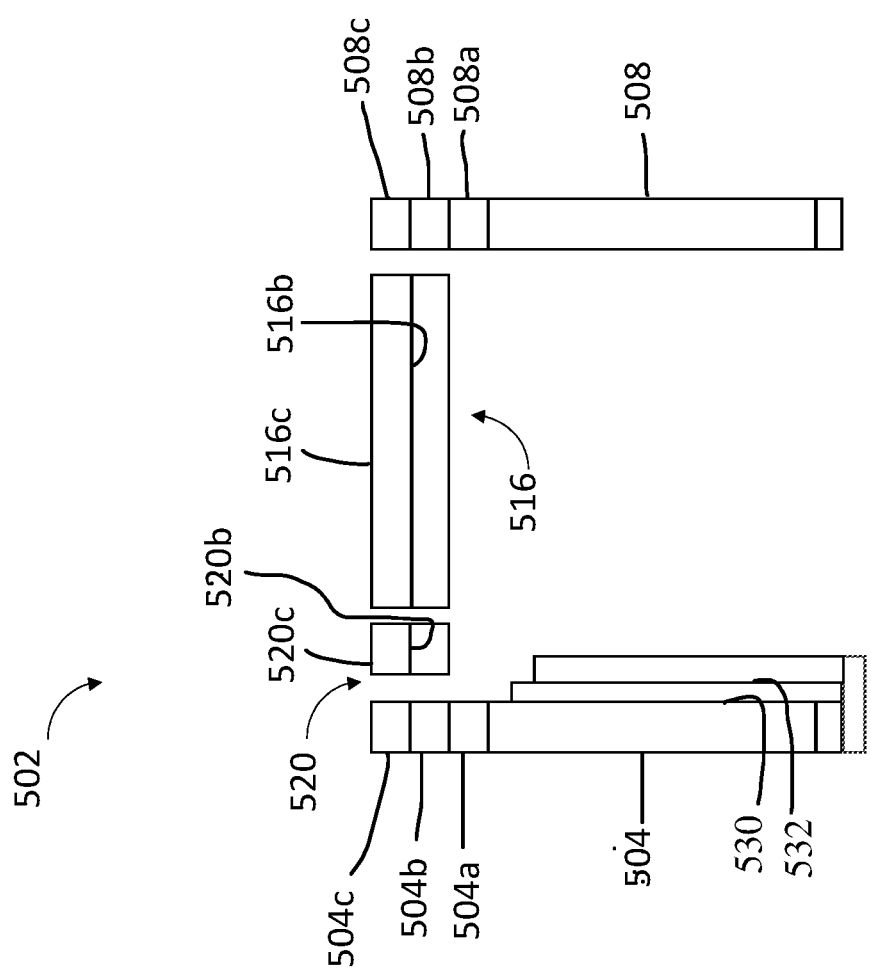
FIG. 5 shows a first side perspective of an array-unit according to the present invention.

FIG. 5 show other, non-limiting views of one opening (502) of the microshutter array of the present invention. FIG. 5 shows a view of the opening, wherein blade (516) is in the closed position. FIG. 6 shows a view of the opening, wherein blade (616) is in the open position. Opening (502) has a first sidewall (504) and a third sidewall (508), along with a third and fourth wall that are not seen. First sidewall (504) and third sidewall (508) comprise, consist essentially of, or consist of, silicon. Upper parts of first sidewall (504) and third sidewall (508) have, present thereon, a layer of silicon dioxide ($SiO_2$—504a, 508a). A layer of $Si_3N_4$ (504b, 508b) is present on silicon dioxide layer (504a, 508a), and a layer of aluminum (504c, 508c) is present on layer of $Si_3N_4$ (504b, 508b). First sidewall (504) has, on an inside surface thereof, first-electrode layer (530) of aluminum oxide ($Al_2O_3$). A first layer (532) of aluminum is present on the first-electrode layer (530). A second-electrode layer (534) of aluminum is aligned substantially orthogonally to first-electrode layer (530).

In FIG. 5, blade (516) has a first layer (516b) of silicon nitride ($Ni_3N_4$) and a second layer (516c) of aluminum. Torsion bar (520) also has a first layer (520b) of silicon nitride ($Ni_3N_4$) and a second layer (520c) of aluminum.

FIG. 6 has the corresponding sidewalls and layers of the opening of FIG. 5.

Without wishing to be bound to a particular theory, it is believed that two-dimensional actuation scheme allows for selective opening and closing of single, individual microshutters of the microshutter array. For example, in a hypothetical embodiment of a microshutter array having, for example, ten array-units, it is possible to open one blade of the multiple blades in the microshutter array. For example, an AC resonant or pulsed signal is sent along shutter electrodes that run along array rows. Applying resonant or pulsed signals to shutter electrodes, while maintaining the substrate at ground, causes microblade shutters to open. Negative DC potentials (with respect to ground) are then applied to electrodes that run along columns on the array back walls. Microshutters at the intersection of the AC resonant or pulsed signals on shutter electrodes and DC potentials on the first sidewall electrodes are pulled in and latched against the first sidewall. The DC potential applied on the first sidewall electrode is sufficient to keep the shutter latched against the first sidewall without application of voltage on the shutter electrode. Removing the potential on the first sidewall allows the shutters to close using the torsion bar's elastic restoring force.

While the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

As used herein, the term "micrometers" can be represented by the symbol "μm." As used herein, the indefinite articles "a" and "an," and the definite article "the" can refer to one or at least one. As used herein, and unless otherwise indicated, the terms "blade" and "shutter blade" refer to the same item.

EXAMPLES

Figure 8:
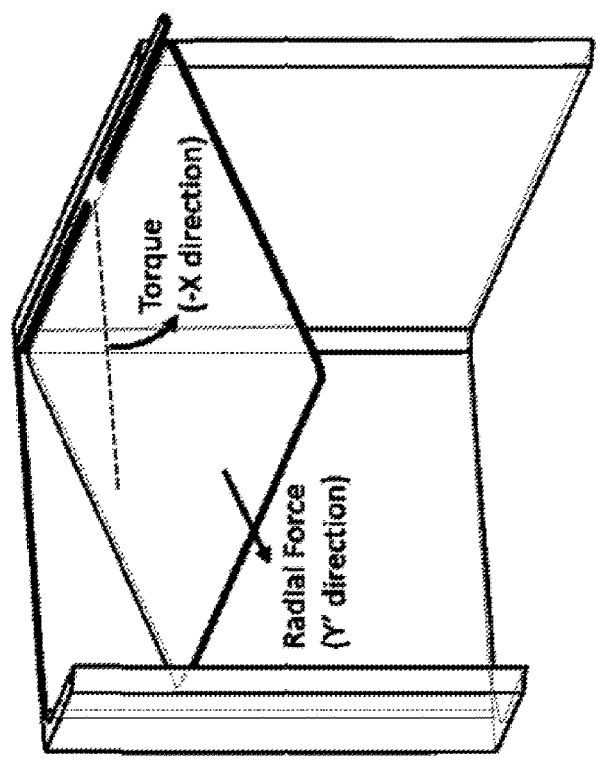
FIG. 8 shows a second three-dimensional perspective of an array-unit according to the present invention.
Figure 7:
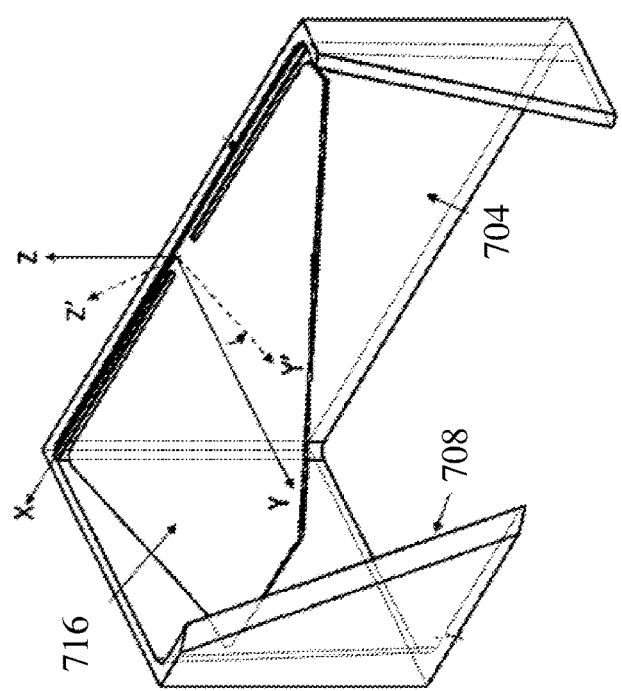
FIG. 7 shows a first three-dimensional perspective of an array-unit according to the present invention.

FIGS. 7 and 8 shows section view of an opening of a microshutter. FIG. 7 shows, for reference, first sidewall (704), third sidewall (708), and microshutter blade (716), shows each axis. FIG. 8 shows components of forces, i.e., torque force and radial force, included throughout the examples.

Example 1

Figure 9:
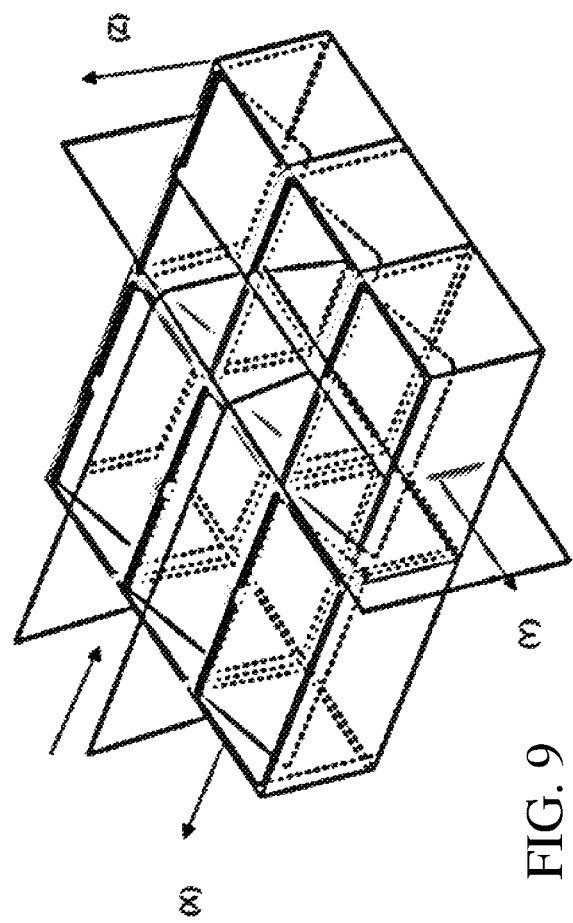
FIG. 9 shows a geometry of a microshutter array used in an electrostatic modelling of the microshutter array.
Figure 12:
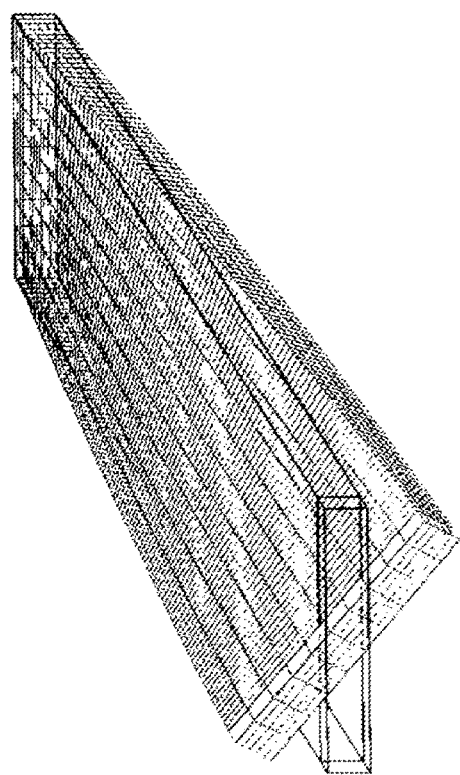
FIG. 12 shows a model of half of a torsion bar wherein a rotational force is applied to a center-section of the torsion bar.

The microshutter geometry is simplified to generate an effective model geometry. FIG. 9 shows how the computational geometry is defined in a microshutter array (MSA). The MSA is sliced along the column direction at the center of unit shutter to use its symmetry (darker cut plane), and a zero-charge condition is applied to the cross-section. The zero-charge condition means no electric field component crosses the surface, and therefore it describes the electrostatic symmetric plane. Then, only one-unit shutter sectional-slice is chosen and all the other parts on front and back are cut away (lighter shaded plane).

Figure 10:
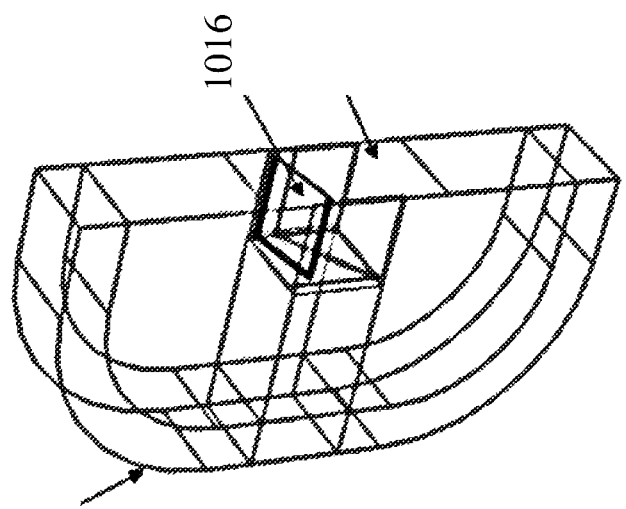
FIG. 10 shows upper and lower regions of the geometry built for the electrostatic model.

FIGS. 9 and 10 show a corresponding geometry built for the electrostatic model. The center region ($-100$ μm$<z<0$ μm) represents a 100 μm thick MSA (FIG. 9), while the upper and lower regions represent surrounding air (FIG. 10). A repeating condition is applied on the front and back cut surface, which means the electrostatic potential at front surface is same as corresponding position on back surface. Adjacent shutters within computational window are simply assumed as a silicon frame at ground or frame bias voltage. Ground potential is applied at infinity ($z=\pm\infty$, $x=\infty$) to achieve the correct electrostatic potential gradient. FIG. 10 shows shutter blade (1016), for reference.

The shutter blade is located within the egg crate of the silicon frame. The shutter blade angle is defined as the angle between the xy-plane and the shutter blade plane. In an actual MSA, the shutter blade is bi-layer of silicon-nitride and aluminum. However, including dielectric domain (silicon nitride) adjacent to a conductor (aluminum) makes the electrostatic force calculation inaccurate, because of the way Maxwell's stress tensor is defined. It is the best practice to use a conductor domain surrounded by air domain to calculate correct electrostatic force applied to the conductor. Also, silicon nitride thickness (250 nm) is much smaller than overall length of field line (100 μm). Therefore, in this model, the silicon nitride layer of shutter blade is ignored. A one μm padding air domain around the blade metal domain is prepared for even and symmetric meshing to improve electrostatic force calculation accuracy. The simulation generates series of geometries of different shutter angle and calculate torque applied to the shutter blade. The calculated torques are doubled to get values for full shutter.

Figure 11:
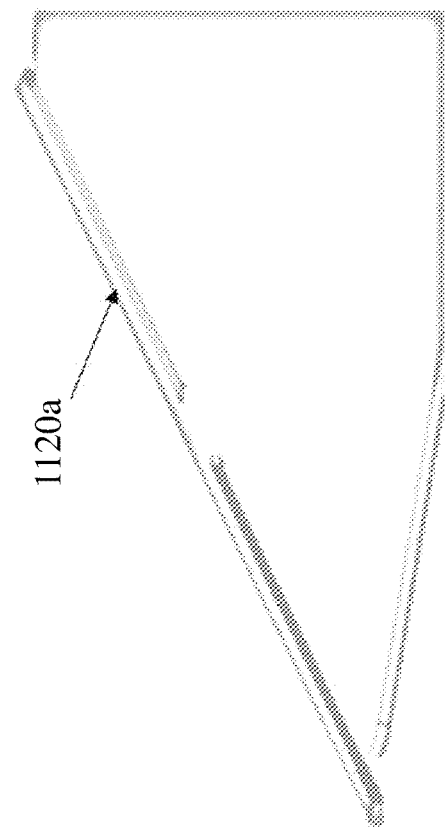
FIG. 11 shows one view of a torsion bar of a linear microshutter element according to the present invention.

FIG. 11 shows a model of the torsion bar, which is a pair of collinear elastic rods that holds a shutter blade on silicon frame. A half section (FIG. 1120a) of the unit torsion bar (shown on FIG. 11) is used as the calculation geometry. A fixed boundary condition is applied on one side of the bar, which represents an anchor point to the silicon frame. On the opposite side, roller boundary condition is applied. This means, in the real device, a center point of a whole torsion bar does not move in torsion bar's longitudinal direction but is allowed to move or rotate within the plane. Forces of identical amount in opposite direction are applied on two short edges of 'roller' surface to apply pure torque without displacement. The force is applied in multiple steps with incremental increase each time to minimize nonlinear error by deformation. Displacement of two points on roller surface is monitored to calculate twist angles for each step.

Figure 14:
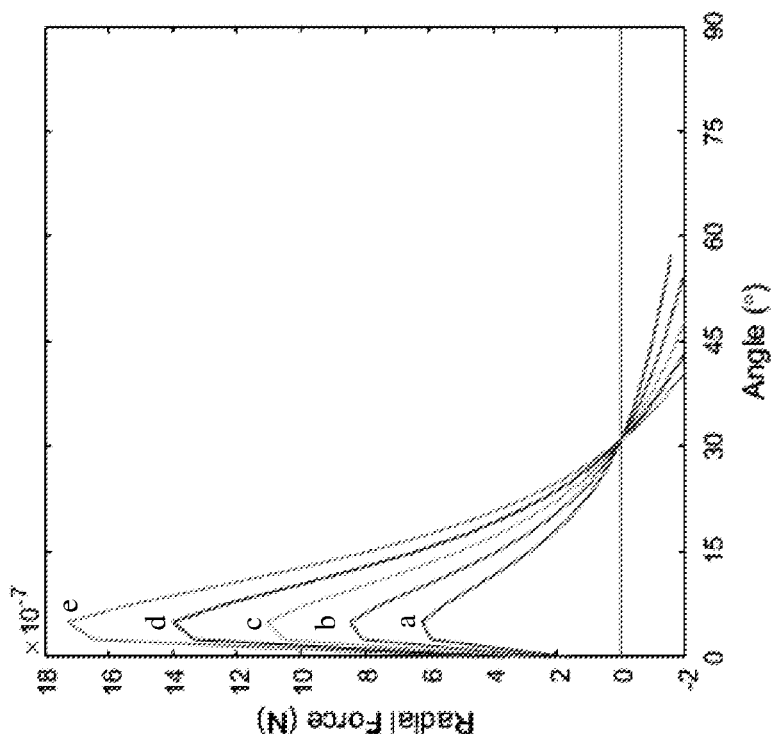
FIG. 14 shows a radial force versus shutter blade angle plot.
Figure 13:
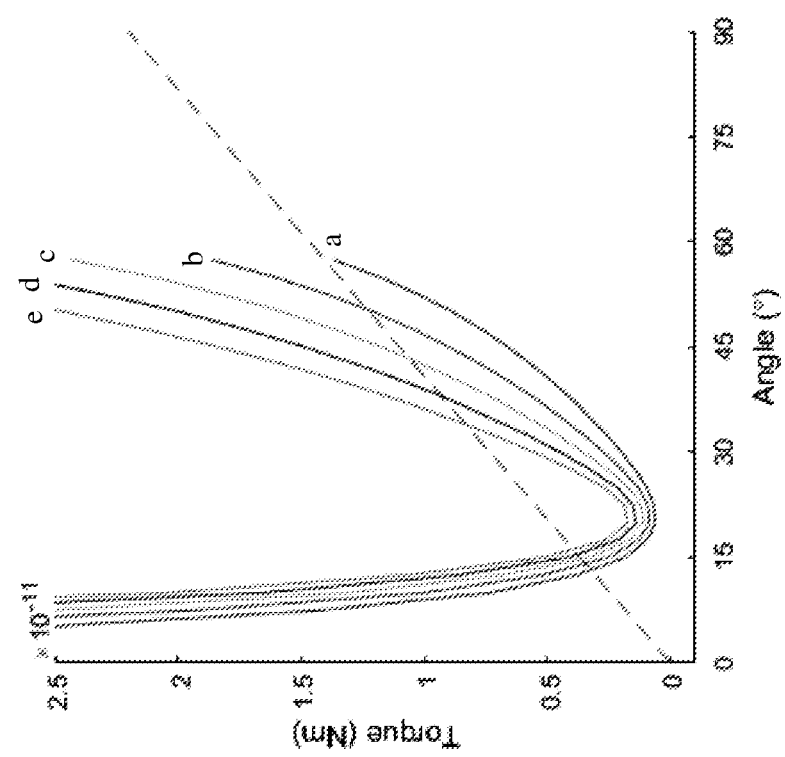
FIG. 13 shows a torque versus shutter blade angle plot.

FIGS. 13 and 14 shows torque and radial direction force applied to a shutter blade at given position (angle) and blade electrode (column electrode) voltage (60 V-100 V, 10 V step). All other electrodes are at 0 V. ES torque near 0° blade position is quite strong, but it quickly decreases as the position angle increases until the angle reaches around 20°. After the lowest point, the torque rapidly increase as the position angle increases. FIGS. 13 and 14 have curves labelled a, b, c, d, and e. In all torque versus angle plots herein, the a curve represents 60 V, the b curve represents 70 V, the c curve represents 80 V, the d curve represents 90 V, and the d curve represents 100 V. In all radial force versus angle plots herein, the a curve represents 60 V, the b curve represents 70 V, the c curve represents 80 V, the d curve represents 90 V, and the d curve represents 100 V. Other figures do not show a, b, c, d, and e, but the curve pattern corresponds to those of FIGS. 13 and 14 and thus show the same voltage steps as in FIGS. 13 and 14.

One torque plot, seen in FIG. 13, is a restoration torque plot created by a twisted torsion bar (gray dashed line), which is based on an experimental measurement. Torque results show that when the shutter blade's angular position is near the lowest torque region, restoration torque exceeds the electrostatic actuation torque. This negative net torque regime makes electrostatic actuation extremely challenging. Therefore, a goal of this study is figuring out better design that electrostatic torque easily exceeds torsion bar's restoration torque.

The radial force is also calculated as a function of angular position (FIG. 14). There is a force peak near 0° which is related to proximity between shutter blade front edge and the silicon front frame. This radial force should be minimized, because it increases torsional stiffness of torsion bar by increasing longitudinal stress.

Example 2

An actual microshutter device is not always fabricated exactly as designed. The front-to-back alignment process is the most problematic process in the manufacturing of the MSA, and it is susceptible to dimensional error. While most same-side processes are done within about a ¼ μm accuracy, front-to-back misalignment is often as much as 1 μm or more. Considering that the gap between the shutter blade and the frame is around 2 μm, the amount of misalignment from front to back, which defines the relative position of shutter blade and frame, is significant. This misalignment was studied to see its effect, by introducing frame geometry with an intentional 1 μm shift in the x and y directions.

Figure 15:
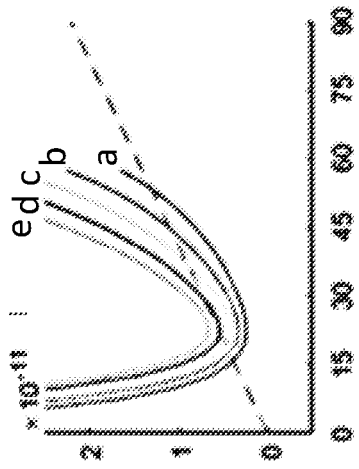
FIGS. 15-17 show torque versus shutter blade angle plots for embodiments wherein the shutter blade is shifted in a y-direction 1 micron to the left, wherein the shutter blade is centered, and wherein the shutter blade is shifted in a y-direction 1 micron to the right.
Figure 16:
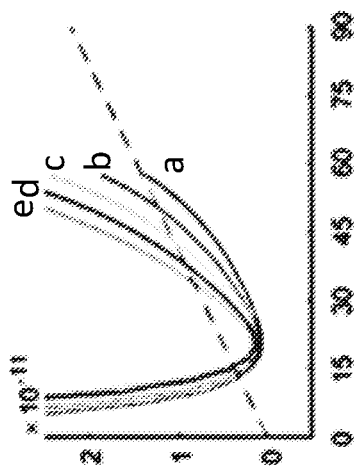
Figure 17:
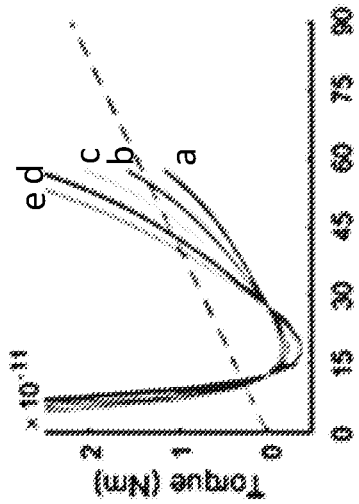
Figure 18:
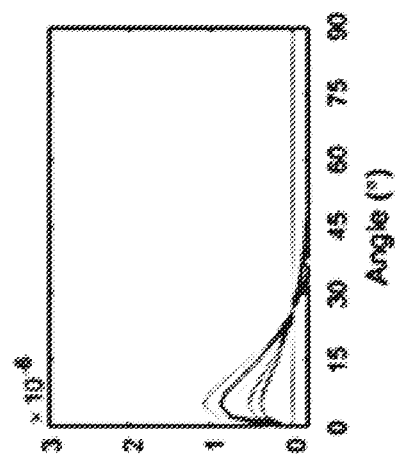
FIGS. 18-20 show radial force versus shutter blade angle plots for embodiments wherein the shutter blade is shifted in a y-direction 1 micron to the left, wherein the shutter blade is centered, and wherein the shutter blade is shifted in a y-direction 1 micron to the right.
Figure 19:
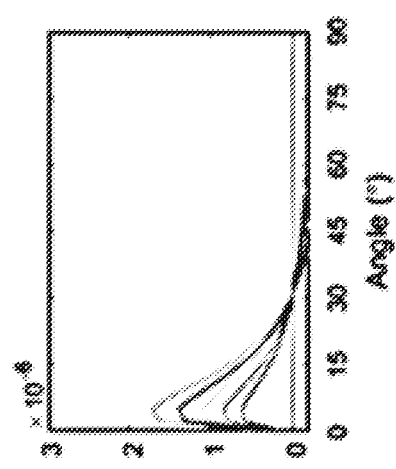
Figure 20:
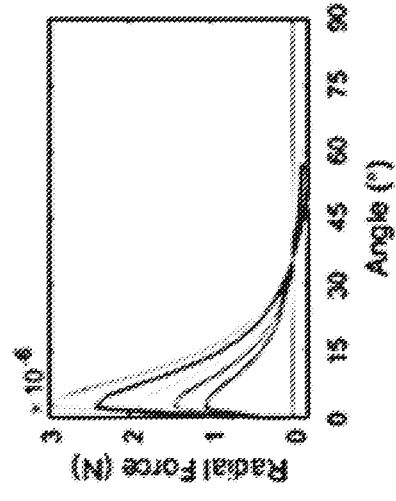

FIGS. 15-17 show electrostatic torque and radial force of a 1 μm positive misalignment case (FIG. 17) and a 1 μm negative (FIG. 15) misalignment case. Positive misalignment (FIG. 17) shows overall increased torque and decreased radial force compared to original design case (FIG. 16). FIGS. 18-20 show a corresponding radial force as a function of angular position for 1 μm positive misalignment (FIG. 20), 1 μm negative misalignment (FIG. 18), and original design (FIG. 19). When positive misalignment happens, the shutter is easier to actuate, because the electrostatic torque curve can exceed the restoration torque. The negative misalignment case shows the opposite of the positive misalignment case. As seen in FIG. 15, the torque becomes extremely low and the radial force increases dramatically. The negative misalignment makes actuation of the shutter blade almost impossible.

Example 3

Figure 22:
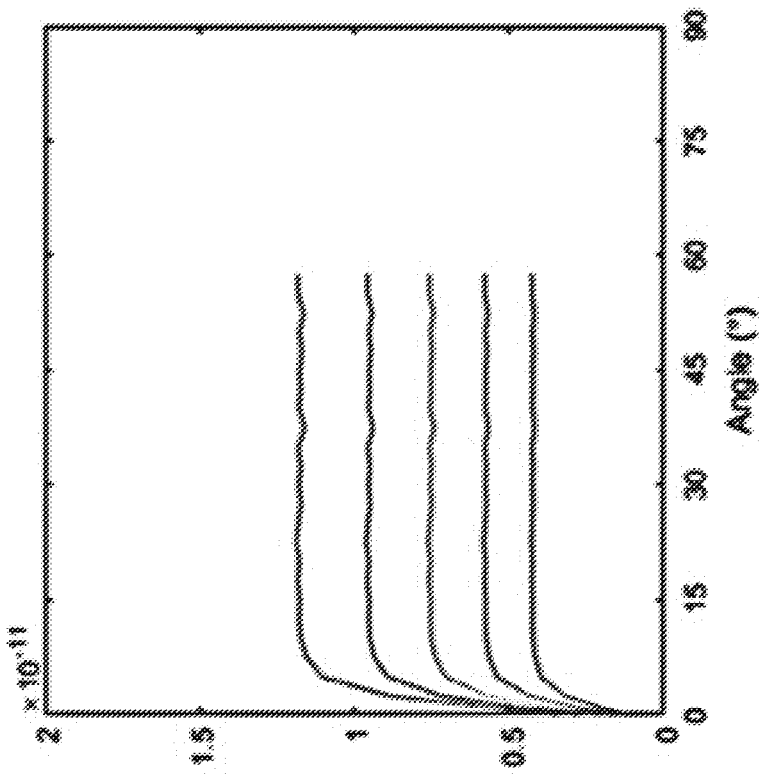
FIGS. 21-22 show a z-directional torque versus angle plot for microshutters having different blade lengths.
Figure 21:
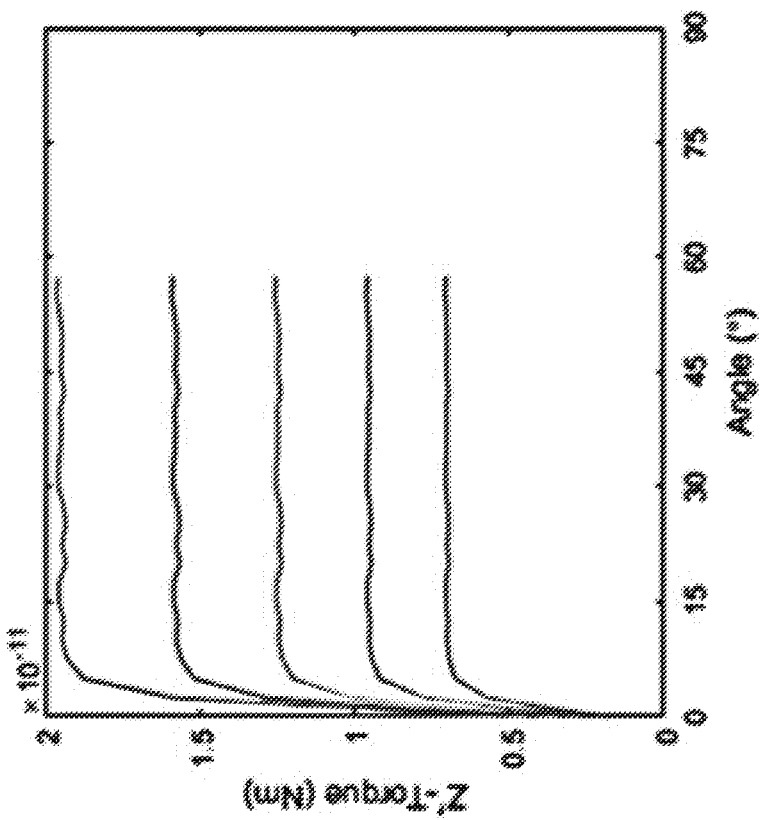

For a device fabricated exactly as intended, x-directional electrostatic forces on both sides of blade are even and do not contribute to shutter blade's movement. In case of x-misalignment, shutter blade is pulled to near side wall by force imbalance on both sides. This effect is calculated by running this half-shutter model twice with same amount of x-shift on frame in different direction. The results are combined to get z'-axial torque over actuation range. FIG. 21 shows z' torque on the shutter between 0° and 60° position. The torque increases quickly and maintain same value over most actuation range. Further study is needed to understand how much torque is allowable for normal operation, but it is always better to minimize this z'-torque, because it causes unintended directional motion of shutter blade. A modified geometry with 2 μm narrower shutter blade is studied with identical conditions. The result (FIG. 22) shows z'-torque reduced about 40% compared to original design in case of 1 μm x-misalignment.

Example 4

One of the ways to reduce amount of pulling interaction between frame and shutter blade front is shortening the length of blade. Shutter blades geometry of different length are used to calculate torque and radial force. FIGS. 23-26 show torque versus angle plots for MSAs having shutter blade lengths between original length (left) and 3 μm shorter (right) by 1 μm step. FIGS. 27-30 show the respective radial force versus angle plots. As shutter length gets shorter, the lowest torque value around 20° position increases. According to the results, a blade of 2 μm shorter than original design, or shorter, can achieve electrostatic actuation under 100 V. An amount of radial force needed for actuation also decreased as blade length gets shorter. It is also more forgiving for actuation when y-misalignment happens.

Example 5

Figure 31:
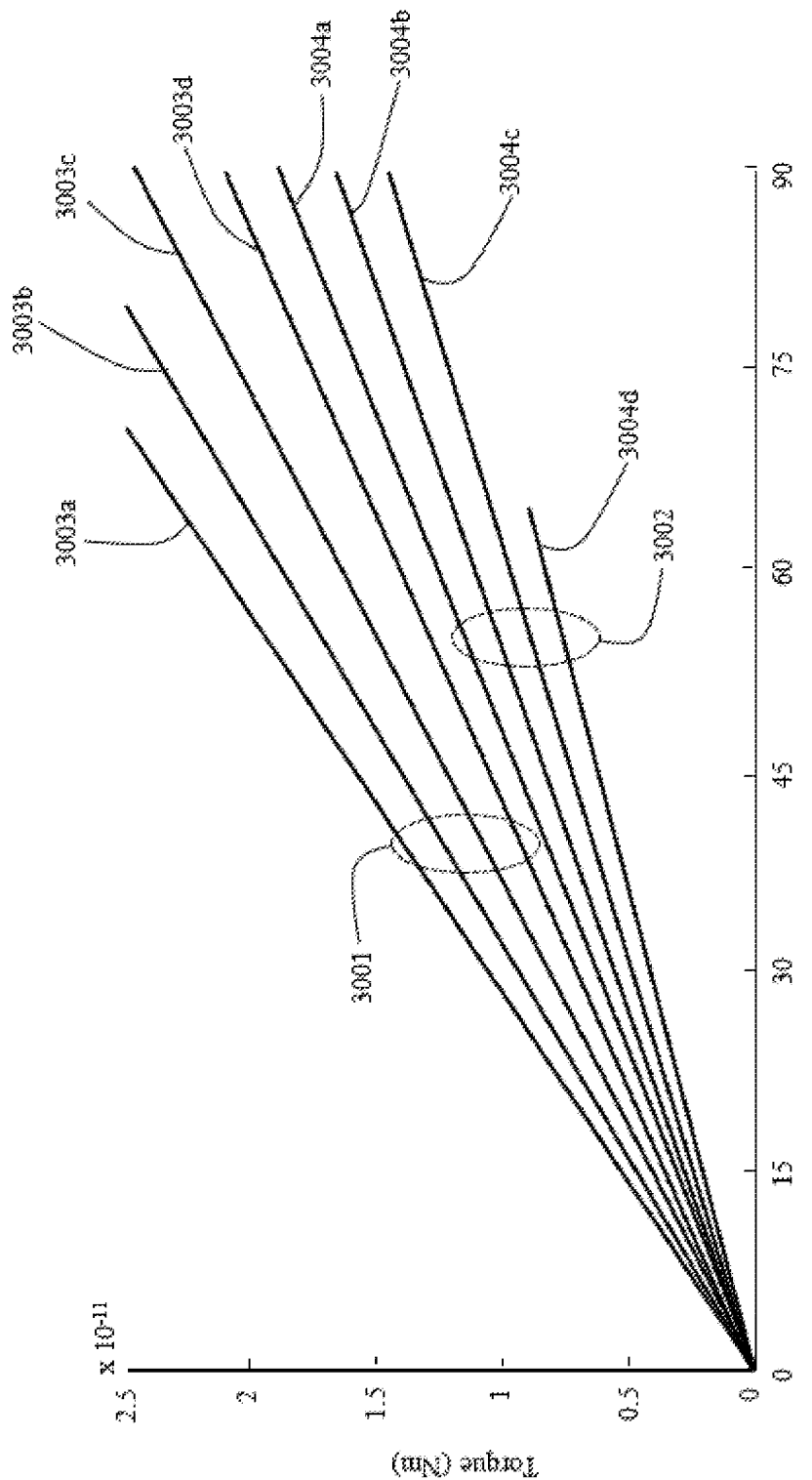
FIG. 31 shows torque versus angle plots for torsion bars of varying thicknesses and widths.

FIG. 31 shows a torsional stiffness of torsion bar with varying dimensions. As the torsion bar rotates in –X (actuation) direction, it applies torque in the +X direction by its elasticity. Torque increase rate as a function of rotation angle is defined as torsional stiffness. A variable that mostly affects torsional stiffness of the MSA's torsion bar is its dimension (thickness and width). Two MSAs were fabricated with two different thickness of the $Si_3N_4$ layer (250 nm & 300 nm), each torsion bar having a design width of 2 μm. The final torsion bar width can vary between 1.4-2.0 μm because of processing inconsistency. In this study, $Si_3N_4$ torsion bar with thickness of 250 nm & 300 nm and width of 1.4-2.0 μm were studied. In FIG. 31, 3001 represents a grouping of torque versus angle plots for torsion bars having a $Si_3N_4$ layer thickness of 300 nm and widths of 2.0 micrometers (3003a), 1.8 micrometers (3003b), 1.6 micrometers (3003c), and 1.4 micrometers (3003d), respectively. 3002 represents a grouping of torque versus angle plots for torsion bars having a $Si_3N_4$ layer thickness of 250 nm and widths of 2.0 micrometers (3004a), 1.8 micrometers (3004b), 1.6 micrometers (3004c), and 1.4 micrometers (3004d), respectively. FIG. 31 shows solid mechanics simulation result of torsions bar having varying dimensions. Restoring torque increases linearly as rotation angle increases. Torsional stiffness increases as both dimensions increases.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A microshutter array comprising:
   a frame having a plurality of openings, each opening defined by a first sidewall, a second sidewall, a third sidewall opposing and parallel to the first sidewall, and a fourth sidewall, each opening including a light-transmissive portion configured to span an area;
   a plurality of linear microshutter elements configured to extend across at least a part of the area, wherein each linear microshutter element comprises a blade extending in a length direction across and blocking the light-transmissive portion, a neck extending from the blade, and at least one torsion bar connected to the neck and to sidewalls of the frame, the at least one torsion bar being rotatable under the influence of an applied electrostatic field, wherein, for each torsion bar, upon application of an electrostatic field, (a) the respective blade moves into an orientation such that the blade no longer blocks the light-transmissive portion, (b) the respective neck moves with respective blade movement, and (c) the torsion bar rotates, and wherein the blade comprises a distal edge that is parallel to the third sidewall such that a gap between the distal edge and the third sidewall is not more than 3 micrometers; and
   a plurality of electrodes, at least two electrodes per each linear microshutter element,
   wherein the plurality of electrodes are connected to a voltage generator that generates electricity at a target voltage of from 60 volts to 100 volts, and the voltage generator is configured to generate the target voltage starting from zero (0) volts in no more than 20 microseconds.

2. The microshutter array of claim 1, wherein each blade has a width of from 192 micrometers to 198 micrometers and a length of less than 93 micrometers.

3. The microshutter array of claim 1, wherein the plurality of linear microshutter elements comprises over 200,000 linear microshutter elements.

4. The microshutter array of claim 1, wherein the frame comprises one opening per linear microshutter element, each opening has a length and a width, the width is longer than the length, each linear microshutter element is mounted for movement within a respective one of the openings, and the respective torsion bar of each linear microshutter element spans the width of the respective opening and connects to the frame on opposing sidewalls that define the width of the respective opening.

5. The microshutter array of claim 1, wherein the blade comprises a first layer and a second layer, the first layer extending beyond the second layer such that the second layer does not cover the entirety of the first layer, the distal edge being the edge of the first layer.

6. The microshutter array of claim 1, wherein each linear microshutter element is independently controllable.

7. A method of making the microshutter array of claim 1, comprising:
   micromachining a first surface of a silicon wafer, thereby removing sections of the silicon wafer while maintaining a design that results in the formation of the torsion bar, the neck, and the blade;
   depositing, via chemical vapor deposition, a silicon-nitride composition on surfaces of the torsion bar, the neck, and the blade, thereby forming silicon-nitride covered surfaces;
   depositing, via electron beam deposition, aluminum on the silicon-nitride covered surfaces; and
   reactive ion etching a second surface of the silicon wafer, thereby removing a plurality of sections from the silicon wafer and forming a plurality of openings in the silicon wafer.

8. A method of controlling the microshutter array of claim 1, comprising ramping up a voltage of the voltage generator to the target voltage in a time of not more than 16 microseconds.

9. A microshutter array comprising:
   a frame having a plurality of openings defined by a first sidewall, a second sidewall, a third sidewall opposing and parallel to the first sidewall, and a fourth sidewall, each opening including a light-transmissive portion configured to span an area;
   a plurality of linear microshutter elements configured to extend across at least a part of the area, wherein each linear microshutter element comprises a blade extending in a length direction across and blocking the light-transmissive portion, a neck extending from the blade, and a torsion bar connected to the neck and to sidewalls of the frame, the torsion bar is rotatable under the influence of an applied electrostatic field, for each torsion bar, upon application of an electrostatic field, (a) the respective blade moves into an orientation such that the blade no longer blocks the light-transmissive portion, (b) the respective neck moves with respective blade movement, and (c) the torsion bar rotates; and
a plurality of electrodes, at least two electrodes per each linear microshutter element,
wherein the electrodes of the plurality of electrodes are connected to a voltage generator that generates electricity at a target voltage of from 60 volts to 100 volts,
wherein the blade comprises a distal end that is parallel to the third sidewall and spaced from the third sidewall by a gap, and the gap defines a spacing of not more than 7 micrometers.

10. The microshutter array of claim 9, wherein each blade has a width of from 192 micrometers to 195 micrometers and a length of less than 93 micrometers.

11. The microshutter array of claim 9, wherein the plurality of linear microshutter elements comprises over 200,000 linear microshutter elements.

12. The microshutter array of claim 9, wherein the frame comprises one opening per linear microshutter element, each opening has a length and width, the width is longer than the length, each linear microshutter element is mounted for movement within a respective one of the openings, and the respective torsion bar of each linear microshutter element spans the width of the respective opening and connects to the frame on opposing sidewalls that define the width of the respective opening.

13. The microshutter array of claim 9, wherein the blade comprises a first layer and a second layer on top of the first layer, the first layer extends beyond the second layer such that the second layer does not cover the entirety of the first layer, and the distal edge is defined by the edge of the first layer.

14. The microshutter array of claim 13, wherein the first layer comprises $Si_3N_4$ and the second layer comprises aluminum, gold, or a combination thereof.

15. The microshutter array of claim 13, wherein the distal edge of the blade is flush with an edge of the first layer, the gap defines a spacing of not more than 7 micrometers, the gap is defined between the edge of the first layer and the third sidewall, and the second layer is offset at least one micron from the distal edge of the blade.

16. The microshutter array of claim 9, wherein each linear microshutter element is independently controllable.

17. The microshutter array of claim 9, wherein each opening of the plurality of openings has a first width and a second width, the first width is a distance between the second sidewall and the fourth sidewall at a top of the opening near the blade, the second width being a distance between the second sidewall and the fourth sidewall at a bottom of the opening, the first width and the second width being different from one another.

18. The microshutter array of claim 17, wherein each blade has a width of from 192 micrometers to 198 micrometers.

19. The microshutter array of claim 9, wherein each blade has a first width and a second width, the first width is defined by the proximal edge, the second width being defined by the distal edge, the first width being longer than the second width such that the proximal edge is longer than the distal edge.

20. A method of making the microshutter array of claim 9, comprising:
micromachining a first surface of a silicon wafer, thereby removing sections of the silicon wafer and maintaining a design that results in the formation of the torsion bar, the neck, and the blade;
depositing, via chemical vapor deposition, a silicon-nitride composition on surfaces of the torsion bar, the neck, and the blade, thereby forming silicon-nitride covered surfaces;
depositing, via electron beam deposition, aluminum on the silicon-nitride covered surfaces; and
reactive ion etching a second surface of the silicon wafer, thereby removing a plurality of sections from the silicon wafer and forming a plurality of openings in the silicon wafer.

* * * * *